Patented Nov. 14, 1939

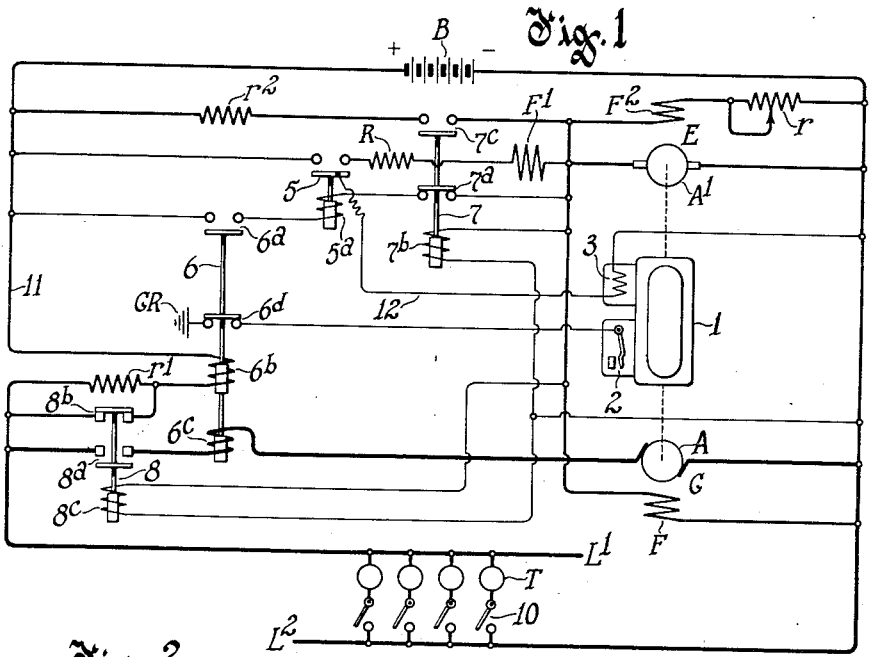

2,179,680

UNITED STATES PATENT OFFICE 2,179,680

CONTROLLER FOR ELECTRIC GENERATING SYSTEMS

Walter O. Baer, Milwaukee, and Edwin W. Seeger, Wauwatosa, Wis., assignors to Cutler-Hammer, Inc., Milwaukee, Wis., a corporation of Delaware Application April 30, 1938, Serial No. 205,324

8 Claims. (Cl. 290—30)

This invention relates to electric generating systems.

While not limited thereto the invention is particularly applicable to controllers for electric generating plants which employ an internal combustion engine and connected generator for supplying service mains with current at a relatively high voltage (such as 110 volts), and an exciter which is coupled to the engine and acts as a motor when supplied with current from a low voltage source such as a storage battery to effect cranking of the engine and which also acts when the engine becomes self-operative to excite the generator and effect charging of the storage battery.

The present invention has among its objects to provide an improved and simplified starting controller for electric generating plants.

Another object is to provide a controller for generating plants of the aforesaid character having improved control means for establishing power connections to cause operation of the exciter as a motor when there is need for current on the service mains, and for automatically interrupting such connections when the engine becomes self-operative.

Various other objects and advantages of the invention will hereinafter appear.

The accompanying drawing diagrammatically illustrates certain embodiments of the invention which will now be described, it being understood that various modifications may be made in the embodiments illustrated without departing from the spirit and scope of the appended claims.

In the drawing,

Figure 1 diagrammatically illustrates an automatic control system embodying the invention, and Fig. 2 diagrammatically illustrates a modification of the control system shown in Fig. 1.

Referring to Fig. 1, the same illustrates an electric generating plant including a single phase alternating current generator G for supplying current to service mains $L^1$, $L^2$, an exciter E for said generator and an internal combustion engine 1 for driving said generator and exciter, said engine being provided with the usual magneto 2 and an electromagnetically operated choke 3. Generator G is provided with an armature A and a field winding F, and exciter E is provided with an armature $A^1$, a starting series field winding $F^1$ and a shunt field winding $F^2$ having an adjustable regulating resistance $r$ associated therewith. As hereinafter set forth, when there is a demand for current on the service mains $L^1$, $L^2$, exciter E is automatically connected to a storage battery B to provide for operation thereof as a motor for cranking of the engine and when the engine becomes self-operative said exciter is automatically connected to said storage battery to charge the same. Also as hereinafter set forth generator G is normally disconnected from the service mains $L^1$, $L^2$ and when the engine is brought up to substantially normal speed said generator is automatically connected to the service mains.

The control means for the aforedescribed generating unit includes a normally open electromagnetically operated switch 5 which controls a circuit for effecting operation of exciter E as a motor and which also controls an energizing circuit for the electromagnetically operated choke 3. Switch 5 is controlled by electromagnetic relays 6 and 7, the former having normally open contacts $6^a$ for establishing an energizing circuit for said switch and the latter having normally closed contacts $7^a$ for interrupting such circuit. Relay 6 is provided with an operating winding $6^b$ and a holding winding $6^c$ which function as hereinafter set forth, and the same is also provided with normally closed contacts $6^d$ for connecting the magneto 2 of engine 1 to a ground GR. Relay 7 is provided with an operating winding $7^b$ which is permanently connected across armature $A^1$ of exciter E and in addition to the contacts $7^a$ said relay is provided with normally open contacts $7^c$ for establishing a charging circuit between said exciter and battery B. The control means also includes a switch 8 having normally open contacts $8^a$ for connecting generator G to the service mains $L^1$, $L^2$ and normally closed contacts $8^b$ for inserting a resistance $r^1$ in the energizing circuit of winding $6^b$. Switch 8 has an operating winding $8^c$ which is permanently connected across armature $A^1$ of exciter E.

The operation of the aforedescribed controller and also the circuit connections therefor will now be more fully described. As shown in Fig. 1, a plurality of translating devices T are connected to service main $L^1$ and each of said translating devices has a switch 10 associated therewith for connecting the same to service main $L^2$. Upon closure of any one of the switches 10 circuit is established from the positive terminal of battery B by conductor 11 through the operating winding $6^b$ of relay 6, through contacts $8^b$ of switch 8, to service main $L^1$, and thence through the translating device T associated with the closed switch 10 to service main $L^2$ which is permanently connected to the negative terminal of battery B. Relay 6 thus responds under the action of its operating winding 6$^b$ and establishes an energizing circuit for switch 5 extending from the positive terminal of battery B through contacts 6$^a$ of said relay, through the operating winding 5$^a$ of said switch, through the normally closed contacts 7$^a$ of relay 7 and through the armature A$^1$ of exciter E to the negative terminal of battery B. Since exciter E is stationary, winding 5$^a$ is subjected to substantially full battery voltage to effect response of switch 5. Switch 5 in responding establishes circuit from the positive terminal of battery B through a starting resistance R, through series field winding F$^1$ and in parallel through armature A$^1$ and shunt field winding F$^2$ to the negative terminal of battery B to cause exciter E to act as a motor for cranking of engine 1. Upon response of relay 6, contacts 6$^d$ interrupt the ground connection for magneto 2 and upon response of switch 5 choke 3 is energized by a circuit extending from the positive terminal of battery B through switch 5 by conductor 12, through the operating winding of said choke to the negative terminal of battery B. The engine is therefore automatically started when there is a demand for current on the service mains L$^1$, L$^2$.

It should be noted that upon closure of switch 5 the operating winding 5$^a$ thereof is connected in shunt across starting resistance R and the series field winding F$^1$ of exciter E through the medium of the contacts 6$^a$ of relay 6 and contacts 7$^a$ of relay 7, and the current passing through said operating winding is therefore dependent upon the voltage drop across said field winding and said resistance. When exciter E is brought up to full cranking speed the voltage across field winding F$^1$ and resistance R drops to a given value which is sufficient to hold switch 5 in closed position. Also when the engine becomes self-operative the voltage generated in exciter E will cause the voltage on operating winding 5$^a$ to drop to zero and when the exciter voltage exceeds the voltage of battery B the voltage on said operating winding is reversed. However, when the voltage on operating winding 5$^a$ drops a given amount below that which exists at full cranking speed, switch 5 opens to interrupt the aforedescribed cranking circuit for exciter E extending through the starting field winding F$^1$.

As is apparent from the drawing, the operating winding 7$^b$ of relay 7 and the operating winding 8$^c$ of switch 8 are each permanently connected across the armature A$^1$ of exciter E to subject the same to the voltage generated in said exciter. As hereinbefore stated, when the engine becomes self-operative the voltage generated in exciter E will cause the voltage on operating winding 5$^a$ to drop to zero and when the exciter voltage exceeds the battery voltage, the voltage on said operating winding is reversed. However, before the reverse voltage on coil 5$^a$ increases to a value which is sufficient to effect reclosure of switch 5, relay 7 responds under the action of its operating winding 7$^b$ and the contacts 7$^a$ thereof open to interrupt the aforedescribed energizing circuit for switch 5. Also upon response of relay 7 the contacts 7$^c$ thereof close to establish a charging circuit between battery B and exciter E, such circuit including a charging resistance $r^2$. When the voltage of exciter E builds up to substantially full value switch 8 responds under the action of its operating winding 8$^c$ and the contacts 8$^a$ thereof close to connect generator G across the service mains L$^1$, L$^2$. Also upon response of switch 8 the contacts 8$^b$ thereof open to insert resistance $r^1$ in the energizing circuit of operating winding 6$^b$ of relay 6, to render said winding incapable of holding relay 6 in its attracted position. However, upon closure of switch 8 the holding coil 6$^c$ of relay 6 is connected in series with generator G to thereby prevent return of said relay to normal position.

Upon opening of all of the control switches 10 the load across the service mains L$^1$, L$^2$ is removed and the holding coil 6$^c$ of relay 6 is deenergized to permit said relay to drop out. Upon dropping out of relay 6 magneto 2 is grounded and the plant is stopped. However, upon reclosure of any one of the switches 10 the plant is restarted, as hereinbefore set forth.

Referring now to Fig. 2, the same illustrates a modification of the control system illustrated in Fig. 1. In the system illustrated in Fig. 1 the cranking connections for exciter E are interrupted when the voltage on operating winding 5$^a$ drops to a given value below that which exists at full cranking speed, and as hereinbefore set forth upon dropping out of starting switch 5 the energizing circuit for the electromagnetically operated choke 3 is interrupted. In some instances it has been found that the control means shown in Fig. 1 does not maintain the electromagnetically operated choke 3 energized for a sufficient period to allow the engine to pick up speed, and the modification shown in Fig. 2 is provided with control means for maintaining switch 5 closed for a longer period than is obtained in Fig. 1. The system illustrated in Fig. 2 is similar to that shown in Fig. 1, with the exception that starting switch 5 is provided with an additional winding 5$^b$ and a set of normally open contacts 5$^c$ for controlling said winding. Switch 5 is energized in the manner described in Fig. 1 and upon response thereof the contacts 5$^c$ connect the operating winding 5$^b$ across the terminals of battery B in series with an adjustable resistance $r^3$. Upon closure of switch 5 winding 5$^b$ acts jointly with the winding 5$^a$ to hold switch 5 in closed position. By adjusting resistance $r^3$ the holding action of winding 5$^a$ can be regulated to maintain switch 5 in closed position until the voltage on winding 5$^a$ approaches zero or is reversed as hereinbefore set forth. The period during which choke 3 is maintained energized can thus be regulated to suit conditions in the generating system.

What we claim as new and desire to secure by Letters Patent is:

1. In an electric generating system, a storage battery, a dynamo electric machine having an armature, an internal combustion engine for driving said machine, said machine being adapted to act as a motor for cranking of said engine, a normally open switch for establishing a motoring circuit for said machine from said battery, an operating winding for said switch and means for connecting said winding across said battery in series with said armature to provide for closure of said switch, said winding being influenced by current conditions in said motoring circuit to provide for opening of said switch when said machine is driven at a predetermined speed by said engine.

2. In an electric generating system, a storage battery, a dynamo electric machine, an internal combustion engine for driving said machine, said machine being adapted to act as a generator to charge said battery and as a motor for cranking of said engine, a normally open switch for establishing a motoring circuit for said machine from said battery, said switch having an operating winding associated therewith, a relay for establishing an energizing circuit for said operating winding from said battery to provide for closure of said switch and for also connecting said operating winding in said motoring circuit to provide for opening of said switch when said machine is driven at a predetermined speed by said engine, and a second relay responsive to a given generated voltage in said machine for interrupting the energizing circuit for said switch and for also establishing a charging circuit between said battery and said machine.

3. In an electric generating system, a storage battery, a dynamo electric machine including an armature, an internal combustion engine for driving said machine, said machine being adapted to act as a motor for cranking of said engine, a normally open switch for establishing a motoring circuit for said machine from said battery, said motoring circuit including an impedance in series with the armature of said machine, an operating winding for said switch and means for energizing said winding from said battery to provide for closure of said switch and for also connecting said operating winding across said impedance upon establishment of said motoring circuit to provide for opening of said switch when said machine is driven at a predetermined speed by said engine.

4. In an electric generating system, the combination with an internal combustion engine, of a dynamo electric machine coupled to said engine and adapted to act as a motor for cranking of said engine and as a generator when said engine becomes self-operative, said machine having a series field winding associated therewith, a normally open switch for establishing power connections for said machine including said series field winding to cause operation of said machine as a motor, an operating winding for effecting closure of said switch, said operating winding being connected in shunt with said series field winding upon closure of said switch to provide for opening of said switch upon a predetermined voltage drop across said field winding.

5. In an electric generating system, a storage battery, an internal combustion engine having an electromagnetically operated choke associated therewith, a dynamo electric machine connected to said engine and adapted to act as a generator when driven by said engine and also as a motor to effect cranking of said engine, a normally open switch for establishing a motoring circuit for said machine from said battery and for also connecting said choke to said battery for energization thereof, an operating winding for said switch and means for energizing said winding from said battery to provide for closure of said switch, said winding being influenced by current conditions in said motoring circuit to provide for opening of said switch when said machine is driven at a predetermined speed by said engine.

6. The combination with an internal combustion engine and a generator to be driven thereby, of an exciter for said generator connected to said engine and adapted to act as a motor to crank said engine, said exciter having an armature and a series field winding to be energized during motoring operation thereof, a storage battery, a normally open starting switch for establishing a motoring circuit for said exciter from said storage battery including said series field winding, said switch having an operating winding associated therewith for effecting closure thereof, and a control switch for connecting said operating winding across said battery in series with the armature of said exciter to effect closure of said starting switch, said operating winding being connected across said series field winding upon establishment of said motoring circuit to provide for opening of said switch upon a predetermined difference in potential across said field winding.

7. In an electric generating system, a generator, service mains to be supplied thereby, an internal combustion engine for driving said generator, an exciter for said generator to be driven by said engine and adapted to act as a motor to crank the same, a storage battery, a normally open electromagnetic starting switch for establishing a motoring circuit for said exciter from said storage battery, a relay responsive upon current demand across said service mains to establish an energizing circuit for said starting switch from said battery, said starting switch when closed being subjected to control by current conditions in said motoring circuit to provide for opening thereof when said engine becomes self-operative.

8. In an electric generating system, a storage battery, a dynamo electric machine, an internal combustion engine for driving said machine, said machine being adapted to act as a motor for cranking of said engine, a normally open starting switch for establishing a motoring circuit for said machine from said battery, a pair of windings associated with said switch, means for energizing one of said windings from said battery to effect closure of said switch and for energizing the other of said windings from said battery upon closure of said switch, said windings acting jointly to hold said switch in closed position and said former winding being influenced by current conditions in said motoring circuit upon establishment thereof to provide for opening of said starting switch when said machine is driven at a predetermined speed by said engine.

WALTER O. BAER.
EDWIN W. SEEGER.